July 18, 1944.  D. I. BROWN  2,353,807

POWER TRANSMISSION MECHANISM

Filed June 17, 1942  3 Sheets-Sheet 1

Inventor
Deskin I. Brown
Maréchal & Roe
Attorneys

July 18, 1944.   D. I. BROWN   2,353,807
POWER TRANSMISSION MECHANISM
Filed June 17, 1942   3 Sheets-Sheet 2
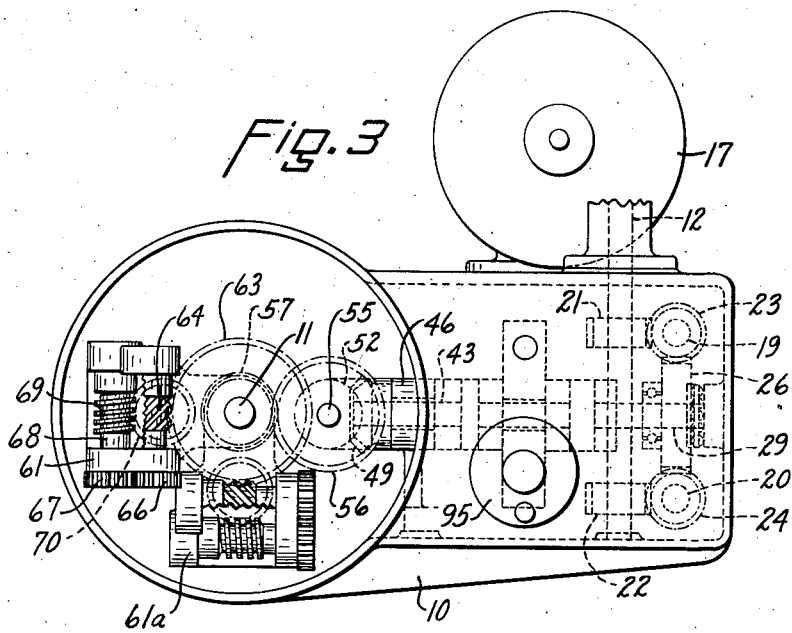
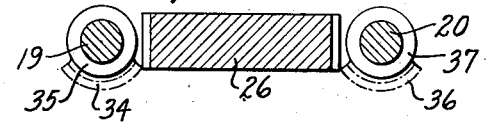
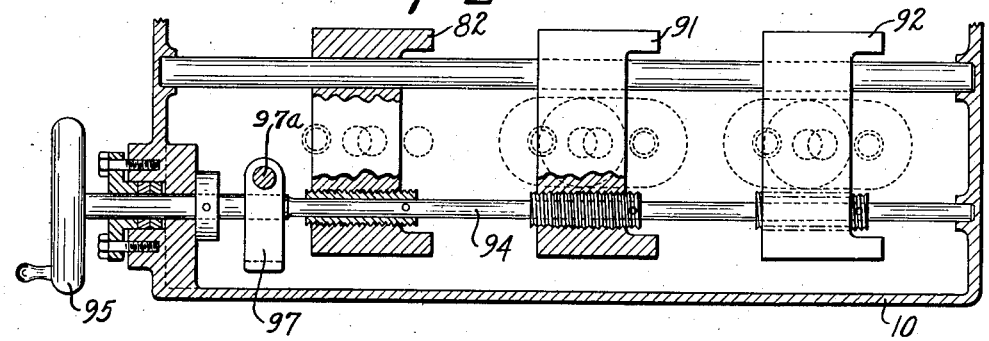
Inventor
Deskin I. Brown
Marechal & Roe
Attorneys July 18, 1944. D. I. BROWN 2,353,807
POWER TRANSMISSION MECHANISM
Filed June 17, 1942 3 Sheets-Sheet 3
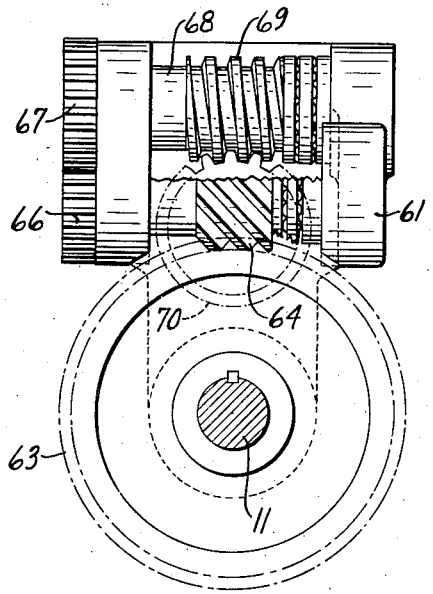
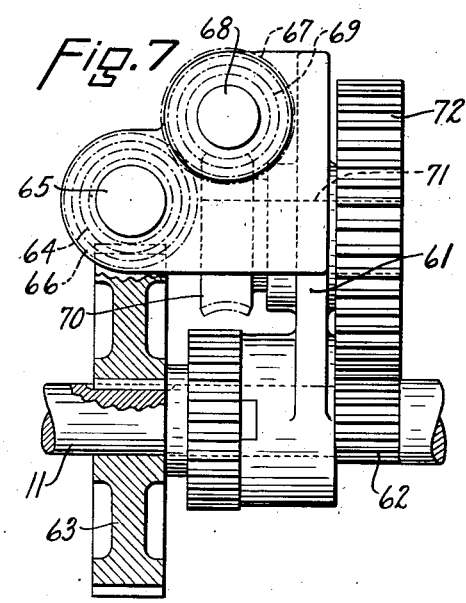
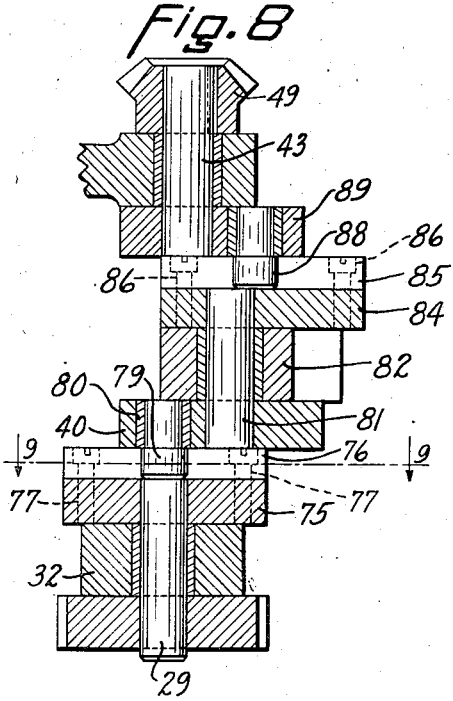
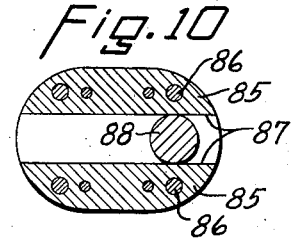
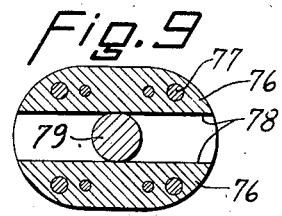
Inventor
Deskin I. Brown
Maréchal & Noe
Attorneys Patented July 18, 1944

2,353,807

UNITED STATES PATENT OFFICE 2,353,807

POWER TRANSMISSION MECHANISM

Deskin I. Brown, Laura, Ohio, assignor of one-half to Walter J. Steiner, Laura, Ohio Application June 17, 1942, Serial No. 447,395

8 Claims. (Cl. 74—112)

This invention relates to power transmission mechanism.

One object of the invention is the provision of power transmission mechanism which is readily adjustable to provide any desired speed reduction between a drive shaft and a driven shaft and providing maintained positive driving connections between the shafts.

Another object of the invention is the provision of a power transmission mechanism embodying a plurality of oscillatable members connected by adjustable couplings to a plurality of oscillatable secondary members which operate in successive timed relation to impart driving movements to a continuously operable driven shaft.

Another object of the invention is the provision of a power transmission mechanism embodying a plurality of oscillatable members, controllable to have any desired amount of oscillatory movement and connected by drive devices providing continuous gear connections to a common driven shaft.

Another object of the invention is the provision of a power transmission mechanism embodying an oscillatory pivotally mounted driving member connected to an oscillatory driven shaft by a plurality of pin and slot connections of a coupling device which is laterally adjustable with respect to the axes about which the pins move to change the amount of oscillatory movement imparted to the driven shaft.

Another object of the invention is the provision of a power transmission mechanism including a driven shaft having a pair of gears, the shaft supporting an oscillatory arm which is driven to impart one-way driving movements to the shaft through a constant mesh gear mechanism which continuously interconnects the two gears on the shaft so that one of those two gears will be positively driven as the arm oscillates in one direction.

Other objects and advantages of the invention will be apparent from the following description, the appended claims, and the accompanying drawings.

In the drawings, in which the preferred embodiment of the invention has been illustrated, Fig. 1 is a top plan view of transmission mechanism embodying the present invention, the upper wall of the transmission housing being removed and a portion of the mechanism being shown in horizontal section;

Fig. 3 is a vertical section taken on the line 3—3 of Fig. 1;

Fig. 4 is a vertical section on the line 4—4 of Fig. 2;

Fig. 5 is a vertical section on the line 5—5 of Fig. 1;

Fig. 6 is a section on the line 6—6 of Fig. 1;

Fig. 7 is an end view of the drive device shown in Fig. 6;

Fig. 8 is an enlarged view of one of the adjustable couplings adjusted to hold the driven shaft stationary;

Fig. 9 is a section on the line 9—9 of Fig. 8; and

Fig. 10 is a section on the line 10—10 of Fig. 1.

Figure 1:
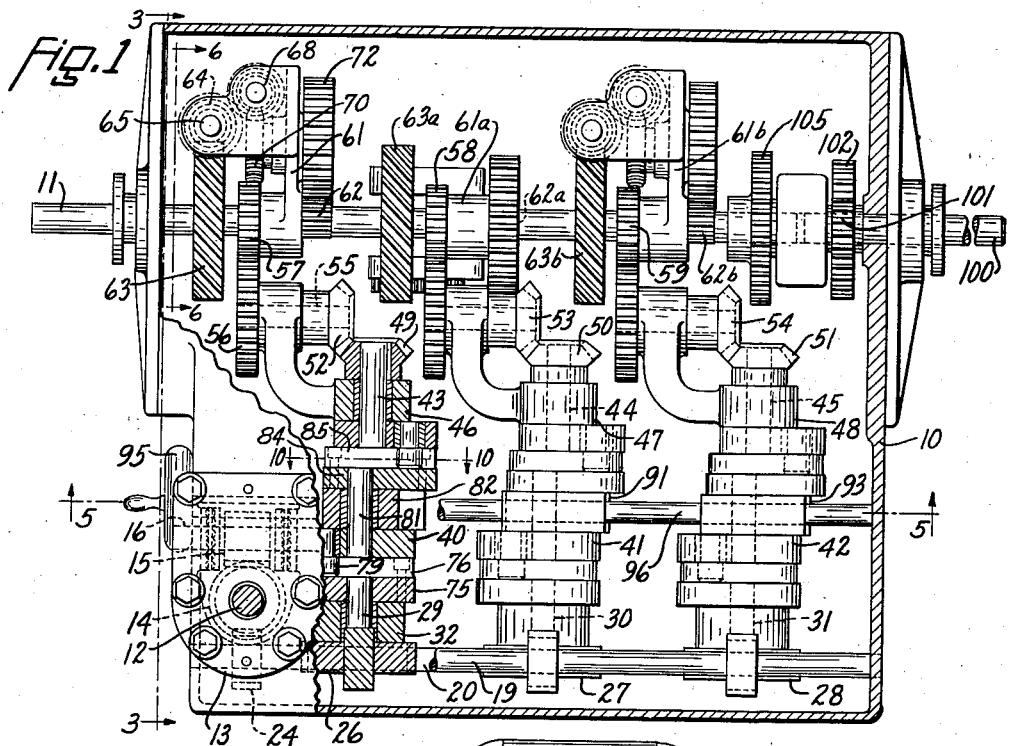
Figure 2:
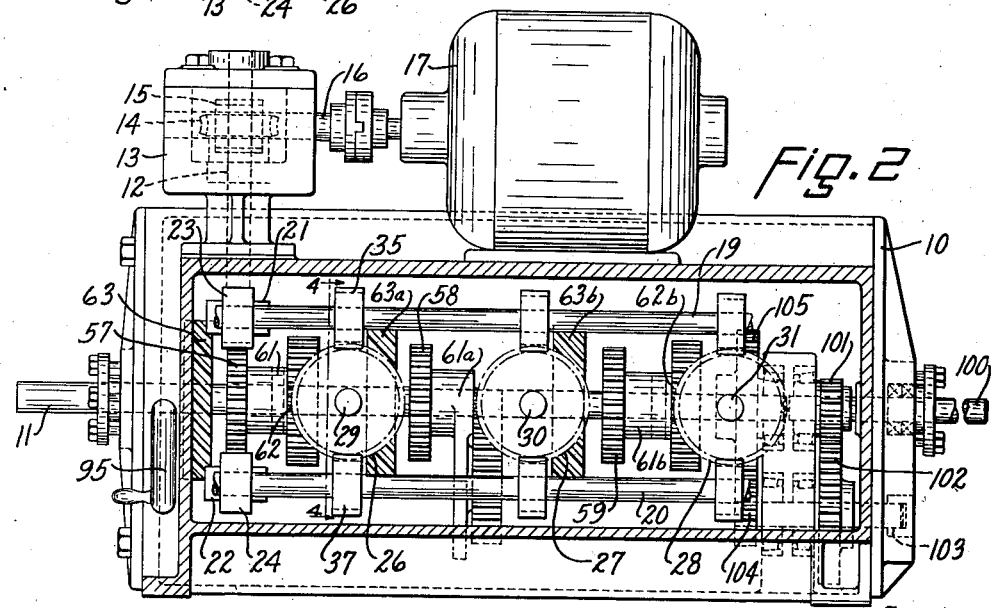
Fig. 2 is a side elevation of the transmission mechanism shown with the end wall of the housing removed.

Referring more particularly to the drawings, in which the same reference numerals have been used to designate corresponding parts in the several views, the transmission mechanism, which is arranged in a housing 10, is adapted to provide any desired speed of rotation of the driven shaft 11, the power being supplied from a drive shaft 12 extending vertically through the top of the housing and rotatably carried by the bracket 13. Fixed to shaft 12 is a worm gear 14 driven by worm 15 on a shaft 16, the latter being driven by an electric motor 17 or any other suitable source of power. The shaft 11 may be used for operating any load in which the accurate control of the speed of operation is advantageous.

The shaft 12 which turns continuously in one direction, preferably at some suitable constant speed, is operably connected in driving relation to a pair of upper and lower shafts 19 and 20 which are rotatably carried in the housing 10. The driving connections between shaft 12 and the two shafts 19 and 20, as shown, comprises worms or helical gears 21 and 22 fixed on the shaft 12 and respectively engaging worms or helical gears 23 and 24 fixed to shafts 19 and 20. The shafts 19 and 20 are thus rotated in the same direction and at the same speed. The two shafts 19 and 20 are operably connected to three gears 26, 27 and 28 which are fixed respectively to short shafts 29, 30 and 31 which are mounted in suitable bearings 32. The connections between the shafts 19 and 20 and the three gears 26, 27 and 28 are such as to oscillate the gears back and forth on their axes in timed relationship so that at any instant, two of these gears will rotate in one direction and the other gear will rotate in a reverse direction. As shown, see Fig. 4, the gear 26 is provided with helical teeth arranged at a 45° angle and meshes with the 45° helical teeth 34 of a gear sector 35, and with the teeth 36 of the gear sector 37, gears 35 and 37 being fixed respectively to the shafts 19 and 20. The teeth 34 extend through about one-fourth of a complete circumference and enter into meshing engagement with the teeth on the gear 26 at the same instant that the teeth 36 move out of meshing engagement with that gear. The teeth 34 move out of meshing engagement with gear 26 at the same instant that teeth 36 move into mesh. As the shafts 19 and 20 rotate in the same direction the gear 26 is turned first in one direction and then in the other. Similar gear sectors are provided on shafts 19 and 20 for similar meshing engagement with the gears 27 and 28, the several gear sectors being so located on the shafts 19 and 20 that as the gear 26 starts to rotate clockwise, gear 28 starts to rotate counterclockwise, and gear 27 has been moved through one-half of its angular travel in one direction or the other.

The three gears 26, 27 and 28 form oscillatable driving members having a definite speed of oscillatory movement and moving through a definite angle. These three oscillatable driving members are connected by means of their respective variable couplings 40, 41 and 42, which will be more fully described, to three oscillatable shafts 43, 44 and 45, journalled in stationary mounting brackets 46, 47 and 48 respectively. These shafts carry bevel gears 49, 50 and 51 meshing with bevel gears 52, 53 and 54. The gear 52 is fixed on a shaft 55 on which is also fixed a spur gear 56 meshing with the gear 57 that is rotatable on the driven shaft 11. In the same way, the gears 53 and 54 are in driving connection with gears 58 and 59 rotatable on the shaft 11. The gears 57, 58 and 59 are oscillated back and forth in successive timed relation. With the couplings 40, 41 and 42 adjusted to provide maximum angular movement of the gears 57, 58 and 59, those gears preferably move through an angle of 180°, gears 57 and 59 moving oppositely at any instant, and gear 58 reversing its direction of movement 90° after the reversal of movement of the gears 57 and 59.

The gear 57 is fixed to a frame or arm 61 which rocks back and forth, being preferably rotatably journalled on the shaft 11 between a pair of gears 62 and 63 which are fixed on that shaft, see Figs. 6 and 7. The gear 63 is provided with 45° helical teeth and meshes continuously with a 45° helical gear 64, the right-hand or rear sides of the teeth of which may be slightly relieved to prevent binding of the parts. Gear 64 is fixed on a shaft 65 which is rotatably journalled in the sides of the frame 61 and is provided at one end with a spur gear 66 fixed on the shaft and meshing with a spur gear 67 fixed on the shaft 68. Shaft 68 is provided with a worm 69 which meshes continuously with the worm wheel 70 fixed on the shaft 71. On the latter is fixed a gear 72 meshing with the small gear 62 on shaft 11. The two gears 62 and 63 have a maintained positive meshing engagement with one another at all times such that as the frame or arm 61 is moved in one direction, say counterclockwise as viewed in Fig. 6, by the gear 56, the gear 72 will be positively rotated by gears 63, 64, 66, 67, worm 69 and gear 70, so as to rock around the gear 62 without producing a driving force on the shaft 11, the shaft 11 being rotated under these conditions from one or the other of the driving devices operated by the gear 58 or 59. When the frame 61 starts to move clockwise after moving 90° from the position shown in Fig. 6, the gear 63, moving clockwise with shaft 11, so controls the gear 72 through the positively acting gearing connecting it to gear 63 as to hold gear 72 against rotation on the frame and causing it to rotate with the frame and about the shaft 11. The gear 72 at this time positively drives the shaft 11 through gear 62. It will thus be seen that the drive device illustrated in Figs. 6 and 7 provides a one-way driving mechanism for the shaft 11, causing a positive drive of that shaft during the time the arm 61 is swinging clockwise, and permitting counterclockwise return movement of the arm while maintaining a positive intergearing connection between the gears 62 and 63 that makes slippage impossible between the gear 57 and shaft 11. During the time the arm 61 moves clockwise and positively operates the shaft 11, at least one of the other similar driving devices on the shaft is moving in a reverse direction, and the third driving device is either moving reversely or is positively driving the shaft which therefore continues to rotate in one direction.

The shaft 11 is provided with a second pair of gears 62a and 63a and supports a second driving device including the oscillatable arm 61a carrying intermeshing gearing similar to the construction shown in Figs. 6 and 7, and operated by gear 58. A third pair of gears 62b and 63b, and a third oscillatable frame or arm 61b is provided for operation by the gear 59. These three driving devices, which are all similar in construction, provide for the timed successive application of force to the shaft 11, which is thus driven continuously in one direction at a substantially uniform speed of operation which is dependent upon the amount of rocking movement imparted to the gears 57, 58 and 59. At the instant of reversal in the direction of movement of one of these gears, there is at least one of the other driving devices acting to positively turn the shaft 11 so that a continuous application of power to the shaft 11 is provided through one or more of the driving devices at any instant. The driving devices including the arms 61 and 61b have been illustrated in Figs. 1 and 3, one back of the other in Fig. 3 and at 90° from the driving device including the arm 61a, which has been shown at its lowermost limit of travel and ready to move clockwise through 180° from that position.

The amount of angular movement imparted to the gear 49, and consequently the amount of angular travel imparted to the frame 61, is controllable at the will of the operator, there being provision for simultaneously and equally adjusting the three variable couplings 40, 41 and 42, which are all of similar construction and which connect the three oscillatable gears 26, 27 and 28 to the three driving devices on shaft 11. The construction of the coupling 40 will be apparent from Figs. 1, 8, 9 and 10. As shown, shaft 29, which is rocked back and forth as already described, carries and oscillates a plate 75 to which plate members 76 are secured as by means of the screws 77. The plate members 76 are provided with plane parallel guide surfaces 78 forming a slot in which a crank pin 79 is guided. The diameter of the pin 79 is such as to permit free movement of the pin along the slot without any substantial play between the pin and the guide surfaces 78. The pin 79 is fixed in a second plate 80 fixed on a shaft 81 which is oscillatably mounted in a bearing block 82. The pin and slot connection thus provided between the shaft 81 and the shaft 29 produces an oscillatory movement of the shaft 81 as the shaft 29 oscillates, the amount of movement imparted to the shaft 81 being dependent upon the relative position of the axes of the two shafts 81 and 29. As shown in Fig. 1 these two shafts may be so positioned as to align with one another, and under those conditions the two shafts 81 and 29 will move through exactly the same angular travel. The bearing block 82 is laterally adjustable, however, so that the two shafts 81 and 29 may be displaced to any desired extent to vary the distance between the center of the pin 79 and the center of the shaft 29. As will be apparent the pin 79 may be centered with the shaft 29 and thus stop movement of the shaft 81, see Fig. 8.

The shaft 81 is fixed to a plate 84 to which a pair of plate members 85 are connected as by means of the screws 86, these plate members 85 having a pair of opposed plane guide surfaces 87, see Fig. 10. Operating in the slot provided by the surfaces 87 is a pin 88 fixed on plate 89 which is carried by a shaft 43 to which the gear 49 is fixed. In the adjusted position of the bearing block 82 illustrated in Fig. 8, the pin 88 is centered with the shaft 81 and as the shaft 81 is oscillated, the pin 88 remains stationary and no movement is imparted to the bevel gear 49. The driven shaft operated by the driving device which is connected to the gear 49 will thus remain stationary. However by adjusting the bearing block 82 to the left from its position shown in Fig. 8 to the position shown in Fig. 1, or to any intermediate position between those limiting positions, the desired angular travel of the bevel gear 49 in the time period required for a cycle of operations in the drive mechanism may be obtained to give any desired speed of rotation to the shaft 11.

The driving devices 41 and 42 are similar in construction to the one just described. The bearing block 82 of the first adjustable coupling is connected to the bearing block 91 of the second and the bearing block 92 of the third coupling by a threaded adjusting shaft 94 which is rotatably supported in the housing 10 and which may be operated at a suitable accessible point by hand wheel 95. As the shaft 94 is turned, the similar threaded connections between the shaft and the several bearing blocks cause similar movement of those parts along guideways provided in the bottom of the housing and along a guide rod 96 which extends through the several bearing blocks. A suitable locking member 97, which can be tightened by means of shaft 97a, may be provided to frictionally engage and hold the shaft 94 fixed in any adjusted position.

As will now be apparent, the several oscillatable driving members 26, 27 and 28 are operated from a common rotatable shaft and oscillate back and forth in timed relation to produce timed oscillatory movement of the several pin and slot connections provided between those oscillatable driving members and the oscillatable secondary members. By suitable operation of the bearing blocks of the couplings provided between the respective primary and secondary oscillatable members, the amount of annular travel imparted to the secondary members can be readily adjusted or reduced to zero. The drive to the secondary members is positive, and the several secondary members are connected positively at all times to the driven shaft 11 by the geared connections of the several drive devices which operate successively to exert positive driving force on the shaft 11. With the driving devices more than two in number the application of power to the shaft 11 will not cease at the moment of reversal of action of any of the driving devices.

The gear reduction provided by the driving mechanism itself, even if the bearing blocks are adjusted for maximum angular travel of the gears 57, 58 and 59, is rather high so that the shaft 11 operates comparatively slowly as compared to the speed of the motor shaft. An auxiliary driven shaft 100 is therefore provided, capable of operation at a much higher speed than shaft 11 but at a speed which is exactly proportional to that of the shaft 11. The shaft 100 which is rotatably mounted in a housing 10, is fixed to a gear 101 which meshes with a larger gear 102 on a countershaft 103. Fixed to the shaft 103 is a drive pinion 104 meshing with a gear 105 fixed on shaft 11.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Power transmission mechanism comprising a rotatable drive shaft, a plurality of oscillatable driving members, means operated by said drive shaft for oscillating said members, oscillatable secondary members, couplings between the driving members and the secondary members operable to vary the amount of oscillatory movement of the secondary members with respect to the amount of oscillatory movement of the driving members, a driven shaft, a drive device connecting each secondary member to the shaft and providing successively operating one-way drives for the driven shaft, each drive device comprising two gears fixed on the shaft, an arm oscillatable on the shaft and connected to its respective secondary member to oscillate in timed relation therewith, and constant mesh gearing carried by said arm and interposed between its respective two gears on the shaft and providing a continuous gear connection therebetween for positively driving the shaft as the arm oscillates in one direction.

2. Power transmission mechanism comprising a rotatable drive shaft, a plurality of pivotally oscillatable driving members, means operated by said drive shaft for oscillating said members, pivotally oscillatable secondary members, a pivotally mounted oscillatable coupling between each driving member and its respective secondary member and means supporting the oscillatable couplings for shifting movement in a direction transverse of its axis of oscillation to vary the amount of oscillatory movement of the secondary member with respect to the coupling and the amount of oscillatory movement of the coupling with respect to the driving member, a driven shaft, and a drive device connecting each secondary member to the shaft and providing successively operating one-way drives for the driven shaft.

3. Power transmission mechanism comprising a driving member pivotally mounted for oscillatory movement, an oscillatory driven shaft, an oscillatory intermediate member pivotally mounted for oscillatory movement on an axis parallel to the axes of the driving member and the driven shaft, a pin and slot connection between one end of the intermediate member and the driven shaft and another pin and slot connection between the other end of the intermediate member and the driving member, means for laterally adjusting the axis of the intermediate member to reduce to zero the amount of oscillatory movement imparted to the driven shaft by oscillatory movement of the driving member, a rotatable driven shaft, an arm rotatably mounted thereon and having a gear connection to the oscillatory driven shaft, a pair of gears fixed on the rotatable driven shaft, and gearing carried by said arm and having constant positive meshing engagement with the pair of gears on the driven shaft and providing a one-way drive for the driven shaft.

4. Power transmission mechanism comprising a driving member pivotally mounted for oscillatory movement, a helical gear fixed to the driving member, a pair of continuously operable driving shafts operable in the same direction, mutilated gears on said pair of shafts successively engageable with said helical gear to oscillate the same, an oscillatory driven shaft, an intermediate member pivotally mounted for oscillatory movement on an axis parallel to the axes of the driving member and the driven shaft, a pin and slot connection between one end of the intermediate member and the driven shaft and another pin and slot connection between the other end of the intermediate member and the driving member, and means for laterally adjusting the axis of the intermediate member to change the amount of oscillatory movement imparted to the driven shaft for each oscillatory movement of the driving member.

5. A one-way driving mechanism for imparting successive driving impulses in one direction to a driven shaft comprising an arm, a driven shaft supporting the arm for oscillatory movement thereon, means for oscillating the arm, two gears rotatable with the driven shaft, and a constant mesh gear mechanism carried by said arm and interposed between the two gears on the shaft and including a drive part meshing with one of said two gears, said gear mechanism having such ratio that the drive part is held fixed on the arm as the arm oscillates in one direction.

6. A one-way driving mechanism for imparting successive driving impulses in one direction to a driven shaft comprising an arm, a driven shaft supporting the arm for oscillatory movement thereon, means for oscillating the arm, two gears rotatable with the driven shaft, and a constant mesh gear mechanism carried by said arm and interposed between the two gears on the shaft and including a drive part meshing with one of said two gears, said gear mechanism having such ratio that the drive part is held fixed on the arm as the arm oscillates in one direction and rotates on the arm during return movements of the arm in the other direction, and additional means for turning the shaft during the return movements of the arm.

7. A one-way driving mechanism for imparting successive driving impulses in one direction to a driven shaft comprising an arm, a driven shaft supporting the arm for oscillatory movement thereon, means for oscillating the arm, two gears rotatable with the driven shaft, and a constant mesh gear mechanism including a worm and worm gear carried by said arm and interposed between the two gears on the shaft and of such ratio that one of said two gears will be positively driven as the arm oscillates in one direction.

8. Driving mechanism for imparting successive driving impulses in one direction to a driven shaft comprising a driven shaft, a plurality of arms mounted for oscillatory movement on said shaft, a common drive means for oscillating said arms in overlapping phase relation, two gears fixed on said shaft adjacent each arm, each arm having a constant mesh gear mechanism carried thereby and interposed between its respective pair of gears on the shaft and including a drive part meshing with one of said gears, each of said gear mechanisms having such ratio that the drive part is held stationary on its respective arm as the arm oscillates in one direction and rotates on the arm during return movements in the other direction.

DESKIN I. BROWN.